EDITORIAL LAYOUT PROJECTOR

Filed June 3, 1968 4 Sheets-Sheet 1

INVENTORS.
ROBERT M. BRINK &
PAUL E. WELCH
BY
Baumbaugh, Frey, Graves & Donohue
their ATTORNEYS.

INVENTORS.
ROBERT M. BRINK &
PAUL E. WELCH
BY
Brumbaugh, Free, Graves & Donohue
their ATTORNEYS INVENTORS.
ROBERT M. BRINK &
PAUL E. WELCH
BY
Brumbaugh, Free, Graves & Donohue
their ATTORNEYS.

INVENTORS.
ROBERT M. BRINK &
PAUL E. WELCH
BY
Brumbaugh, Free, Graves & Donohue
their ATTORNEYS 3,551,042

EDITORIAL LAYOUT PROJECTOR

Robert M. Brink, New Canaan, and Paul E. Welch, Riverside, Conn., assignors to Time, Incorporated, New York, N.Y., a corporation of New York Filed June 3, 1968, Ser. No. 734,074
Int. Cl. G03b *21/26*
U.S. Cl. 353—30 6 Claims

ABSTRACT OF THE DISCLOSURE

The page layout of a printed publication is simulated by an imaging process under the direct physical control of an editor. Controls are provided for selecting pictures and bogus type for simultaneous display on a screen in a simulated layout and for instantaneously cropping, rotating, scaling, positioning, and adjusting brightness levels so that the editor can immediately see and evaluate changes in layout.

BACKGROUND OF THE INVENTION

This invention relates to editorial layout of a printed publication and, more particularly, to novel and highly-effective apparatus and methods facilitating extremely rapid simulation and evaluation of a succession of trial layouts so that an editorial decision regarding the final layout can be arrived at quickly.

Present methods of page layout involve physically pasting black-and-white prints of picture copy and of bogus type on a layout board. This is a slow process and does not provide the editor with a preview of the final product, especially where color printing is to be employed. Layout is extremely important in many cases. Not only the content of an article in a printed publication but also the artistry with which it is presented can influence the contribution of the article to the acceptance of the publication by the readership. The editorial goal is to optimize the subjective impact upon the reader of each two-page array of pictures and text. The layout process involves trial and error, and generally, in the preparation of high-quality publications such as magazines of wide circulation, not one but a number of trial layouts must be prepared before the final layout is selected.

The considerable length of time required to prepare a final layout having artistic merit limits the speed with which an edition of a publication can be prepared for the press. Publications such as news magazines dealing with topical subject matter should of course be prepared for the press with a minimum delay consistent with the maintenance of high editorial standards.

SUMMARY OF THE INVENTION

An object of the invention is to remedy the shortcomings of conventional layout techniques described above. In particular, an object of the invention is to provide methods and apparatus facilitating rapid presentation and evaluation of a succession of trial layouts. Another object of the invention is to permit an editor, working alone, to simulate the appearance, including hue, saturation, and brilliance, of a two-page array of a printed publication in advance of printing.

The foregoing and other objects of the invention are attained, in a representative embodiment of apparatus for simulating the layout of one or more pages of a printed publication, by the combination of storage means for storing a plurality of editorial units for potential inclusion in a layout, selection means permitting identification of selected units in the storage means for inclusion in the layout, and display means for displaying representations of the selected units in a desired pattern. Crop-control means is provided for cropping the representations, scale-control means is provided for controlling the scale of the representations, and position-control means is provided for controlling the position of the representations. In addition, controls are provided for adjusting the angular orientation and the brightness of the representations.

BRIEF DESCRIPTION OF THE DRAWING

An understanding of additional aspects of the invention may be gained from a consideration of the following detailed description of a representative embodiment thereof, taken in conjunction with the accompanying figures of the drawing, in which.

DESCRIPTION OF THE PREFERRED EMBODIMENT

The present editorial layout procedure relies heavily on the ability of an editor to synthesize mentally the effect of layout changes on the impression created by a composite page of pictures and text. This is a difficult task, particularly when color is involved.

Figure 1:
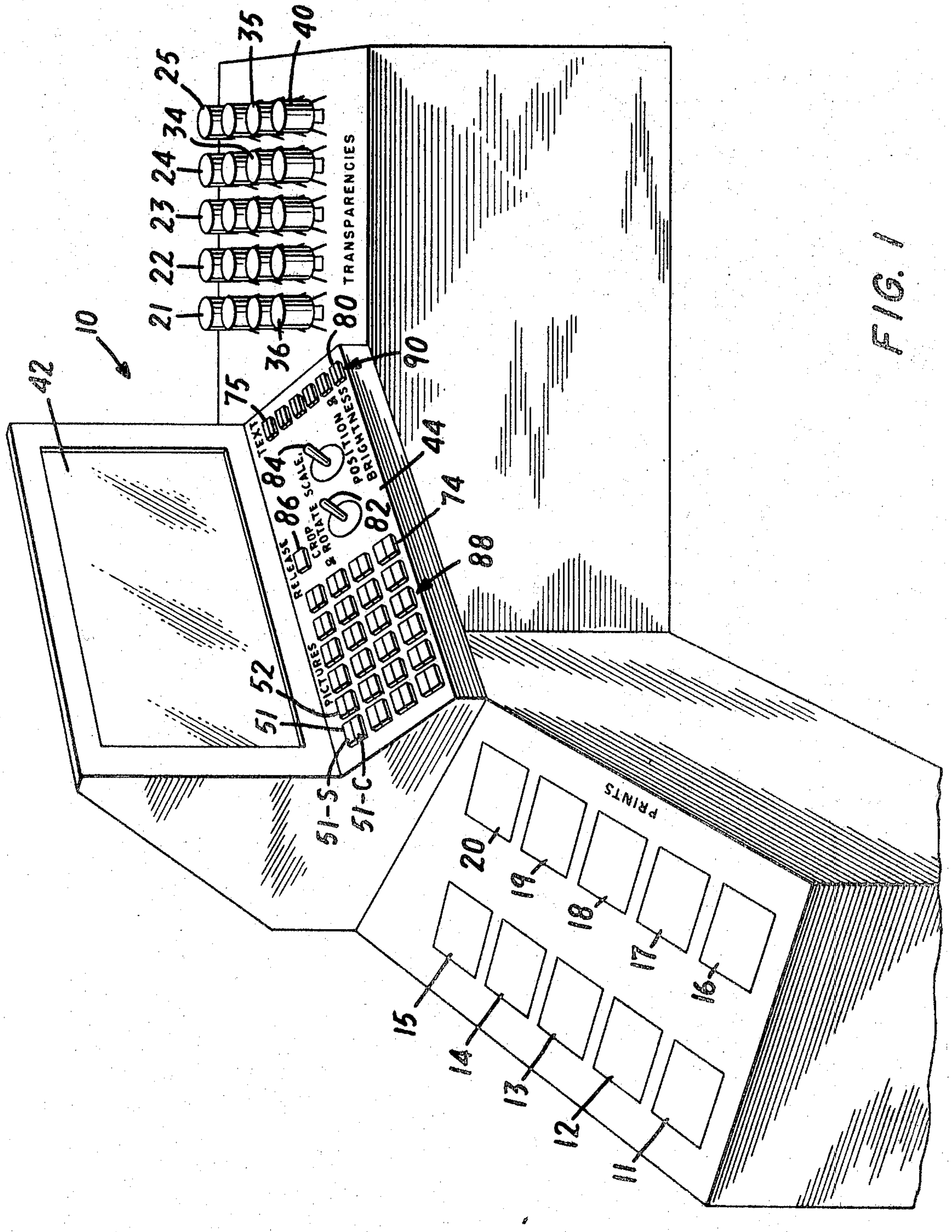
FIG. 1 is a perspective schematic view of a representative embodiment of apparatus constructed in accordance with the invention.

The apparatus shown schematically in FIG. 1 frees the editor and art director from the interruptions and delays which characterize the present process. Apparatus 10 constructed in accordance with the invention includes print stations 11–20 and transparency stations 21–40, a display screen 42 for simultaneously displaying representations of selected pictures and bogus type in a manner simulating a two-page array of a printed publication, and a console 44 containing controls for adjusting the displayed representations as desired by an operator.

The console 44 includes composite buttons 51–80 corresponding, respectively, to the stations 11–40. Each composite button is in two parts, and the parts can be actuated separately. For example, the composite button 51 includes a selection button 51–S and a control button 51–C. Similarly, each of the remaining composite buttons 52–80 includes a selection part and a control part.

The function of each selection button is to select a print or transparency of a picture or text, as the case may be, from one of the stations 11–40 for display on the screen 42. The function of the control button is to bring joy stick control members 82 and 84 into operative association with means for performing a variety of functions with respect to a selected one of the pictures. Any desired number of pictures can be displayed on the screen 42 simultaneously, but only one of the pictures is adjusted at a time for position, scale, orientation, and brightness.

The selection portions of the composite buttons 51–80 may be depressed a first time to cause a representation of corresponding pictures to appear on the screen 42 and depressed a second time to make such representations disappear. In addition, a release button 86 is provided to make all of the representations that may appear on the screen 42 at a given time disappear simultaneously.

The composite buttons 51–80 are arranged in two banks 88 and 90 corresponding to pictures and text, respectively. The bank 88 includes composite buttons 51–74, and the bank 90 includes composite buttons 75–80. The buttons in the bank 88 correspond to the stations 11–34, and the buttons in the bank 90 correspond to the stations 35–40. The composite buttons in the bank 88 are for the display of pictures, and the composite buttons in the bank 90 are for the display of bogus type. Thus, there are tweny-four stations 11–34 for the storage of pictures, and six stations 35–40 for the storage of recordings (which may also be in picture for) of bogus type. In the illustrated embodiment, ten of the twenty-four stations for storing pictures are adapted to store prints. These are the stations 11–20. Fourteen of the stations for storing pictures are adapted to store transparencies, and these are the stations 21–34. All of the six stations for storing recordings of bogus type are adapted to store such recordings in the form of transparencies.

Clearly, the invention is not limited to the specific number of storage stations and corresponding composite buttons illustrated nor to the specific projection means about to be described. Television techniques and other techniques for simulating a layout and permitting immediate changes therein are within the scope of the invention. Apparatus that is particularly desirable because of its ability to produce color images of high quality at moderate cost includes optical projectors of a type described hereinafter. In accordance with the invention, a plurality of optical projectors is employed, one corresponding to each of the storage stations 11–40. Opaque projectors are used at the stations 11–20 and transparency projectors are used at the stations 21–40.

Figure 2:
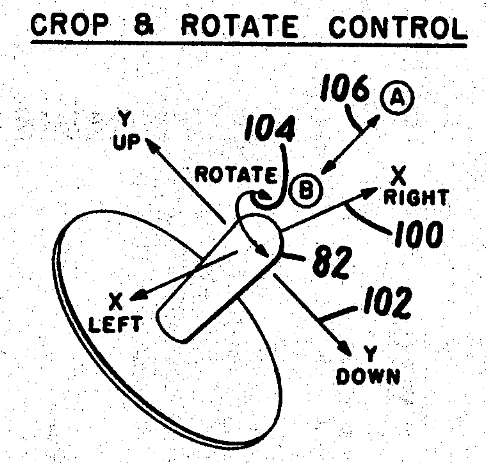
FIG. 2 is a schematic perspective view of a crop and rotation control member for use in accordance with the invention.

FIG. 2 shows in detail the method in which the joy stick control member 82 is manipulated in order to crop and rotate a representation of a picture or bogus type displayed on the screen 42. The joy stick control member 82 is adapted for left and right movement along an X axis 100 and for up and down movement along a Y axis 102. The control member 82 is also adapted for rotational movement about its own axis as indicated by a double-headed arrow 104 and for in-and-out movement along its axis as indicated by a double-headed arrow 106. Movement of the control member 82 in the directions indicated by the arrow 106 is adapted to engage the control member at either of two stations A and B.

Figure 3:
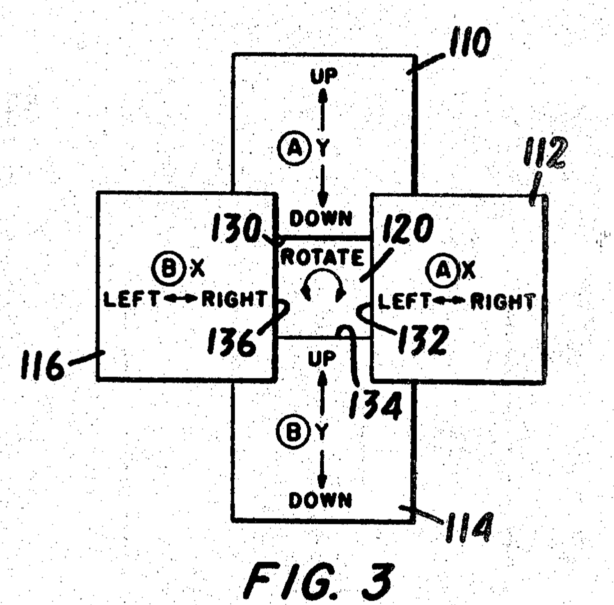
FIG. 3 is a plan view of representative mask means for use in accordance with the invention.

FIG. 3 shows masks 110, 112, 114 and 116 mounted to move in response to movement of the control member 82. When the control member 82 is pulled to station A, movement thereof along the X and Y axes controls the movement of the masks 112 and 110; when the control member 82 is pushed to station B, movement thereof along the X and Y axes controls movement of the masks 116 and 114. At each of the stations A and B, rotational movement of the control member 82 about its axis rotates a picture framed with an opening 120 defined by the masks, 110, 112, 114 and 116.

Specifically, with the control member 82 pulled axially to station A, movement of the control member to the right effects movement of the mask 112 to the right, and movement of the control member 82 to the left effects movement of the mask 112 to the left; at the same station, movement of the control member 82 upwardly causes movement of the mask 110 upwardly, while movement of the control member 82 downwardly causes movement of the mask 110 downwardly. When the control member 82 is pushed to the station B, movement of the control member 82 to the right causes movement of the mask 116 to the right, while movement of the control member 82 to the left causes movement of the mask 116 to the left; similarly, movement of the control member 82 downwardly causes movement of the mask 114 downwardly, and movement of the control member 82 upwardly causes movement of the mask 114 upwardly.

The control member 82 may be associated with on-off switches which cause the masks to move or not depending on whether the switches are closed or with speed-controlling devices by virtue of which the speed of movement of the mask is proportional to the displacement of the control member from its neutral position. Similarly, movement of the control member in a diagonal direction (i.e., displaced from both the X and Y axes) may be adapted to move two adjacent masks at speeds which are functions of the angles between the direction of movement of the control member 82 and the X and Y axes. A variety of joy stick controls are conventionally known and commercially available, and the particular one selected for use in accordance with the present invention is immaterial so long as the requisite movements are imparted to the masks.

By manipulation of the joy stick control member 82, an editor or other operator can quickly crop a picture mounted in the picture areà 120. The picture area 120 has an upper horizontal border defined by a lower edge 130 of the mask 110, a right vertical border defined by a left edge 132 of the mask 112, a lower horizontal border defined by an edge 134 of the mask 114, and a left vertical border defined by a vertical edge 136 of the mask 116. Thus, any one of the borders of the picture area 120 can be expanded or contracted independently of the other borders.

Figure 4:
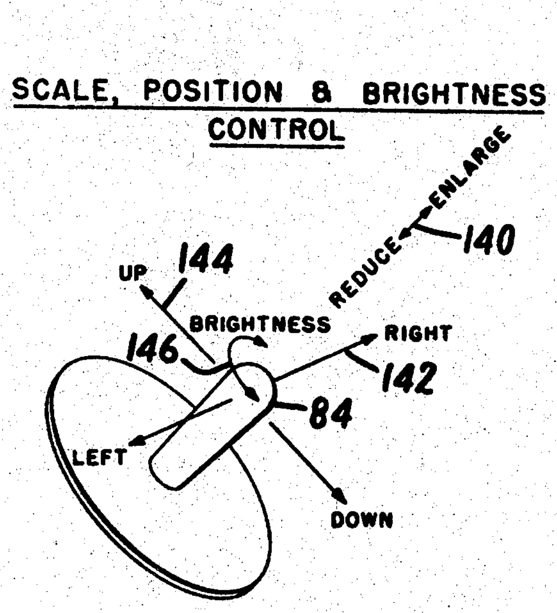
FIG. 4 is a schematic perspective view of a control member for controlling scale, position, and brightness in accordance with the invention.

FIG. 4 shows in detail the movements of which the joy stick control member 84 is capable. Manipulation of the control member 84 adjusts the scale, position, and brightness of representations on the display screen 42. The joy stick control member 84 has four degrees of freedom. It moves with a first degree of freedom in a direction along the axis of the control member 84, as indicated by a double-headed arrow 140, to change the scale of the displayed picture. Pulling the control member 84 towards the operator enlarges the scale of the displayed picture, and pushing the control member axially away from the operator reduces the scale of the picture.

The control member 84 moves with a second degree of freedom back and forth along an X axis 142 and with a third degree of freedom up and down along a Y axis 144 to control the position of a displayed picture in the plane of the screen 42.

The control member 84 moves with a fourth degree of freedom about its axis, as indicated by a double-headed arrow 146, to control the brightness of the representation displayed on the display screen 42.

Figure 5:
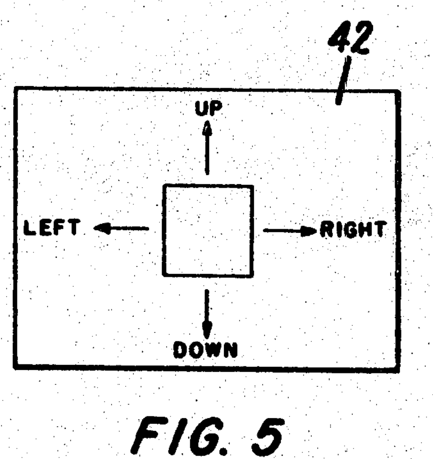
FIG. 5 is a schematic plan view showing movement of an image on a display screen in accordance with the invention.

As FIG. 5 shows, image edges remain parallel to screen edges as the image moves in the indicated directions.

Joy stick controls are conventional per se, and a wide variety of controls may be selected within the scope of the present invention. The more sophisticated controls permit adjustment of the speed with which the image on the screen 42 can be moved and also permit diagonal movement of the image in response to diagonal movement of the control member. Less sophisticated controls may, however, be employed in accordance with the invention.

Figure 6:
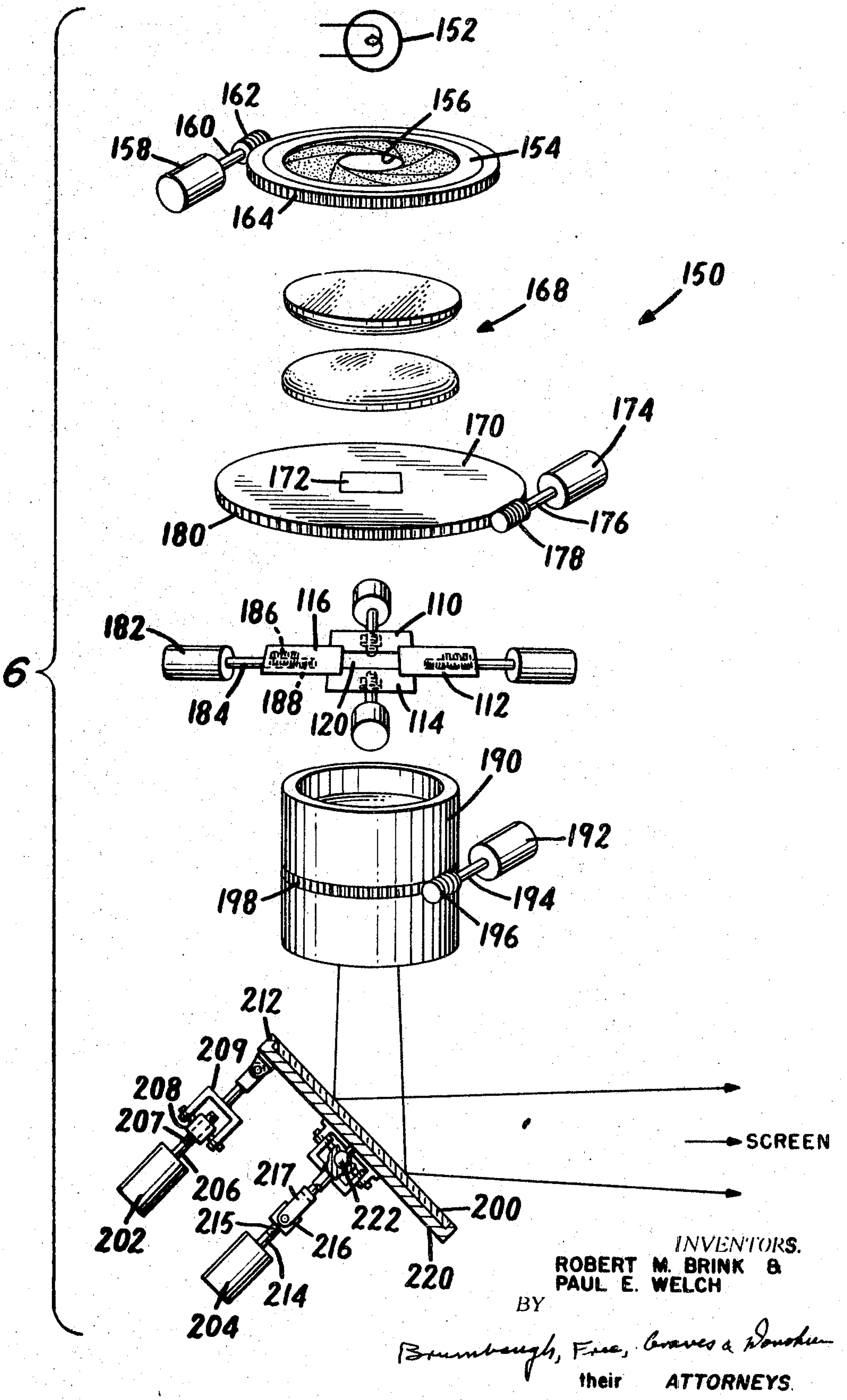
FIG. 6 is a schematic perspective view of representative projection apparatus for use in accordance with the invention.

FIG. 6 shows a representative projector for use in accordance with the invention. The projector may be of the type adapted to project images of opaque pictures or of the type adapted to project images of transparent pictures. The specific projector chosen for illustration in FIG. 6 is the type adapted to project images of transparent pictures and may be mounted at any of the stations 21–40 shown in FIG. 1. The projector 150 shown in FIG. 6 includes a projection lamp 152 and an iris 154 defining an opening 156 to transmit luminous flux from the lamp 152 along a projection axis. Motive means such as a small reversible electric motor 158 drives a shaft 160 having a worm 162 thereon engaging teeth 164 formed on the periphery of the iris 154. The motor 158 is thus adapted to change the size of the opening 156 formed in the iris 154 and thus control the brightness of an image projected by the projector 150. The iris 154 is of course mounted at a position where there is no focusing of an image, so that adjustment of the size of the opening 156 does not result in image cropping.

A conventional condenser lens 168 is mounted between the iris 154 and a rotatable slide holder 170 formed with a mounting aperture 172 therein. Motive means such as a small reversible electric motor 174 drives a shaft 176 having a worm 178 threaded thereon for engaging a gear 180 formed on the periphery of the slide holder 170. The motor 174 is thus adapted to rotate the slide holder 170 to change the angular orientation of a slide mounted in the aperture 172.

The masks 110, 112, 114 and 116 shown in FIG. 3 are mounted below the slide holder 170 as close as possible to a picture mounted in the mounting aperture 172. In this way, adjustment of the positions of the masks serves to crop the displayed representation of the picture without changing the brightness of the portion of the picture which is displayed.

Identical motive means such as a small reversible electric motor 182 is connected identically to each of the mask means. The motors 182 drive shafts 184 having worm threads 186 thereon engaging gear teeth 188 integral with each of the masks 110, 112, 114 and 116, respectively. Thus, each mask is adapted to be moved to expand or contract one of the borders of the aperture 120 to facilitate cropping of the displayed representation of the picture mounted in the mounting aperture 172.

A zoom lens 190 is mounted on the projection axis below the mask means, and motive means such as a small reversible electric motor 192 drives a shaft 194 having a worm thread 196 thereon engageable with teeth 198 formed about the periphery of the zoom lens. In this way, the zoom lens can be rotated to change its focal length in a manner conventional per se and thus control the magnification provided by the projector 150.

A position mirror 200 is mounted on the projection axis for controlling the position of the image displayed on the screen 42. The orientation of the position mirror 200 is controlled by motive means such as small reversible electric motors 202 and 204. The motor 202 drives a shaft 206 having a thread 207 thereon engaging threaded socket 208 pivotally mounted in a yoke 209. The yoke 209 is in turn pivotally connected to an edge 212 of the mirror 200. The motor 204 drives a shaft 214 having a worm thread 215 thereon engaging a threaded socket 216 pivotally mounted in a yoke 217. The yoke 217 is in turn pivotally connected to the rear edge 220 of the mirror 200. The edges 212 and 220 are adjacent to each other, and the mirror is pivotally mounted by a ball-in-socket connection 222 shown (broken away) directly in front of the connection between the yoke 217 and the rear edge 220 of the mirror 200. Thus, combinations of movements of the mirror 200 imparted by the motors 202 and 204 are adapted to position an image projected by the projector 150 onto the screen 42 at any portion of the screen selected by an operator.

A projector such as the projector 150 is mounted at each of the stations 21–40, and a similar projector but one adapted to project opaque pictures is mounted at each of the stations 11–20.

Figure 7:
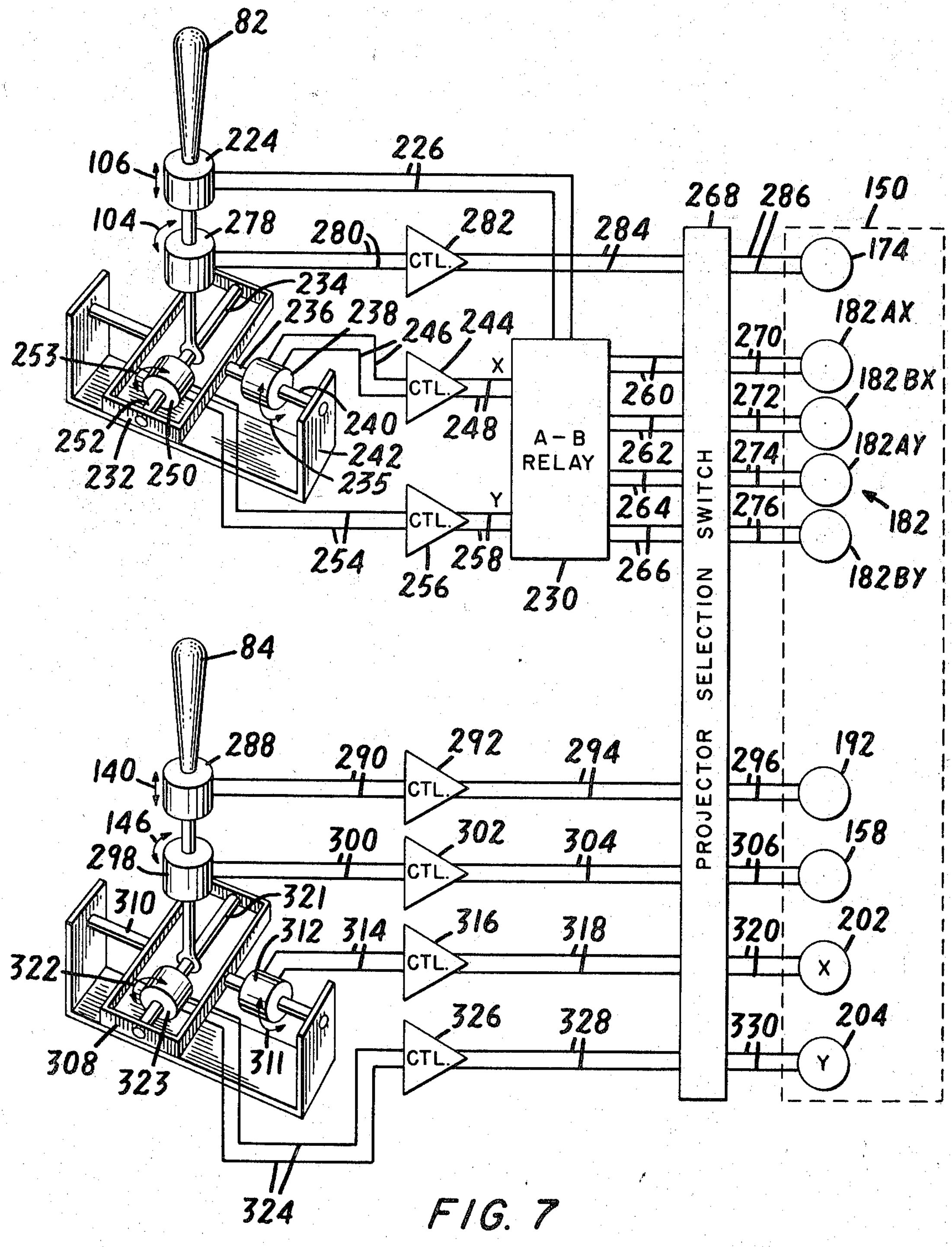
FIG. 7 is a schematic diagram showing the electrical and mechanical connections between the control members and motors shown in FIGS. 2, 4, and 6.

FIG. 7 is a schematic diagram showing one form of electrical and mechanical connections between the control members 82 and 84 and the motors 158, 174, 182, 192, 202, and 204. Many different connections are possible, the structure of FIG. 7 being merely illustrative. While the illustrated structure employs potentiometers developing motor-speed-control signals proportionate to displacement of the control members 82 and 84 from a neutral position, to which position the control members are returned automatically by springs or other biasing means (not shown) when they are released, other types of sensors may be employed which do not include potentiometers. In particular, the sensors may be force-sensitive rather than displacement-sensitive.

In accordance with FIG. 7, the control member 82 is connected to a two-piston switch 224 which, depending on its position, selects the A or B mode of operation described above and illustrated in FIGS. 2 and 3. The switch 224 is connected by leads 226 to a relay 230, the operation of which in the A or B mode depends on the state of the switch 224. By this arrangement, when the switch 224 is pulled to the A position indicated in FIG. 2, left-right and up-down movement of the control member 82 controls the motors 182AX and 182AY and hence the cropping masks 112 and 110, respectively; similarly, when the control member 82 is pushed to the B position illustrated in FIG. 2, left-right and up-down movement thereof controls the motors 182BX and 182BY and hence the cropping masks 116 and 114, respectively.

In either position of the switch 224, left-right movement of the control member 82, as shown by the double-headed arrow 100 in FIG. 2, is effective to pivot a frame 232 connected to the control member 82 by a rod 234. The direction of pivoting of the frame 232 is shown in FIG. 7 by a double-headed arrow 235. The frame 232 is mounted rigidly on and pivots integrally with a rod 236 which is connected to an X sensor 238. The X sensor 238 contains a fixed electrical contact (not shown) connected to a non-rotating rod 240 extending between the sensor 238 and a supporting frame 242 and a movable contact (not shown) which moves in accordance with rotation of the rod 236. One of the contacts is in the form of a spatially-extended resistor so that the two contacts form a potentiometer generating a variable DC voltage for controlling a direction-sensitive motor-control circuit 244 to which the sensor 238 is connected by leads 246. The motor-control circuit 244 is connected by leads 248 to the relay 230.

A Y sensor 250 is also provided and is similar to the X sensor 238. The Y sensor 250 is connected to a rod 252 stationary with respect to the frame 232 and having a contact (not shown) also stationary with respect to the frame 232. The rod 234, which rotates with up-down movement (arrow 102, FIG. 2) of the control member 82 in the direction shown by a double-headed arrow 253, is connected to a movable contact (not shown) within the Y sensor 250. The two contacts thus move with respect to each other in proportion to the movement of the control member 82 in the Y direction, and a variable DC signal is applied to leads 254 for controlling a direction-sensitive motor-control circuit 256 which supplies an input to the relay 230 over leads 258.

The relay 230 is connected by leads 260, 262, 264, and 266 to a projector selection switch 268 by means of which the signals in the leads 260 and 264 (A mode) or 262 and 266 (B mode) are supplied to leads 270 and 274 or 272 and 276, respectively, of a selected projector such as the projector 150. In this way, the motors 182AX and 182AY or 182BX and 182BY, respectively, are controlled to adjust the cropping masks 112, and 110 or 116 and 114 in the manner previously described.

The portion of the control member 82 above a rotation sensor 278 is rotatable about its longitudinal axis as indicated by the arrow 104 (FIGS. 2 and 7) with respect to the portion of the control member 82 below the rotation sensor 278. The rotation sensor includes a movable contact (not shown) attached to the upper portion of the control member 82 and a stationary contact (not shown) attached to the lower portion of the control member 82 so that a potentiometer is formed and a variable DC output is supplied over leads 280 to a direction-sensitive motor-control circuit 282 which supplies an output over leads 284 to the projector selection switch 268. The projector selection switch 268 connects the signal on the leads 284 to leads 286 of a rotation motor 174 of a selected projector 150.

The portion of the control member 84 above a scale sensor 288 is movable in the direction indicated by the double-headed arrow 140 (FIGS. 4 and 7) so that a movable contact (not shown) attached thereto slides across a fixed contact (not shown) attached to the portion of the control member 84 below the scale sensor 288. In this way, a DC output is developed on leads 290 and supplied to a direction-sensitive motor-control circuit 292, which supplies an output over leads 294 to the projector selection switch 268. The projector selection switch 268 supplies the signal on the leads 294 to the leads 296 of the zoom lens drive motor 192 of a selected projector 150.

The portion of the control member 84 above a brightness sensor 298 is rotatable about its longitudinal axis as shown by the arrow 146 (FIGS. 4 and 7) and connected to a moving contact (not shown) which, together with a stationary contact (not shown) connected to the portion of the control member 84 below the brightness sensor 298, constitutes a potentiometer. A DC signal is thus impressed on leads 300 for controlling a direction-sensitive motor-control circuit 302. The circuit 302 develops an output on leads 304 which are connected to the projector selection switch 268. The switch 268 connects the signal developed on the leads 304 to an iris drive motor 158 of a selected projector 150 via leads 306.

Movement of the control member 84 in the direction indicated by the double-headed arrow 142 (FIG. 4) rotates a frame 308 and a rotatable shaft 310 in the direction shown by an arrow 311 (FIG. 7). A potentiometer (not shown) within an X sensor 312 develops an output on leads 314 to control a direction-sensitive motor-control circuit 316 which supplies an output over leads 318 to the projector selection switch 268. The signal on the leads 318 is supplied on leads 320 to a mirror-drive motor 202 of the representative projector 150 selected by the projector selection switch 268.

Movement of the control member 84 in the direction indicated by the double-headed arrow 144 (FIG. 4) rotates a rod 321 as shown by an arrow 322 and adjusts a potentiometer (not shown) within a Y sensor 323. A variable DC signal is thus supplied on leads 324 to a direction-sensitive motor-control circuit 326. The circuit 326 supplies an output on leads 328 to the projector selection switch 268. The projector selection switch 268 supplies the signal developed on the leads 328 over lines 330 to the mirror-drive motor 204 of the projector 150 selected by the projector selection switch 268.

The switching by which any projector can be connected to the joy stick controls and the switching required to turn on the projection lamps are fully understood by those skilled in the art and need not be described.

In operation, an editor, art director, or another person performing the editorial function of layout assembles in the storage positions 11–40 editorial units such as pictures and representations of textual material. Preliminary layout instructions may or may not be provided. A trial two-page layout is simulated by pressing various ones of the compound buttons 51–74. The lower portion of each compound button associated with a displayed picture is pressed in turn to permit cropping, rotating, scaling, positioning, and adjusting brightness levels for that picture. These operations are performed separately for each picture by simultaneous or sequential manipulation of the control members 82 and 84.

The first trial layout can be immediately altered if it is not satisfactory and the effect of the second trial layout immediately seen and evaluated. A succession of trial layouts can be prepared in rapid sequence so that the desired layout is quickly arrived at. At this point a complete two-page spread is visible on the screen 42 substantially as it will appear in the printed publication. The impact of the spread on the readership can be foreseen more accurately than in accordance with conventional techniques because of the excellent simulation provided in accordance with the invention, including accurate rendition of hue, saturation, and brilliance.

At one of these stations 11–40, a layout grid is mounted, and this grid is projected on the screen by selection of the appropriate button 51–90. A photograph of the screen completes the process. The photograph when developed serves as a guide in the preparation of the presses in the usual manner.

Thus there is provided in accordance with the invention novel and highly-effective methods and apparatus facilitating layout of a printed publication. In accordance with the invention, higher standards of layout can be maintained because of the ability to employ color in the layout and the ability to see and compare a plurality of trial layouts in rapid succession. In addition to permitting higher standards, the present invention permits greater speed in the preparation of a layout and reduces the time required to prepare a publication for the press.

Many modifications of the representative embodiment of the invention disclosed herein will readily occur to those skilled in the art. For example, television techniques may be employed in lieu of optical techniques. Also, where optical techniques are employed, the division between opaque and transparency projectors on the one hand and picture selection buttons and text selection buttons on the other may be varied to suit the needs of the publication. Also, the particular joy stick controls and mask means employed may be varied within wide limits. Accordingly, the invention is to be construed as including all of the modifications thereof within the scope of the appended claims.

We claim:

1. In apparatus for simulating the layout of one or more pages of a printed publication, the combination of storage means for storing a plurality of editorial units for potential inclusion in said layout, selection means for identifying selected units in said storage means for inclusion in said layout, display means for displaying representations of said selected units in any desired pattern, and crop control means for individually cropping each of said representations, scale control means for controlling the scale of each of said representations, and position control means for controlling the position of each of said representations on said display means in which said crop control means, said scale control means, and said position control means facilitate immediate alteration of said pattern.

2. Apparatus according to claim 1 further comprising rotation control means for controlling the angular orientation of said representations.

3. Apparatus according to claim 1 further comprising brightness control means for controlling the brightness of said representations.

4. Apparatus according to claim 1 further comprising means for operatively coordinating said crop control means, said scale control means, and said position control means with a selected one of said representations in order to perform cropping, scaling, and positioning of said one selected representation independently of the remaining ones of said representation.

5. Apparatus according to claim 1 in which said display means is optical.

6. Apparatus according to claim 1 in which said display means includes means for displaying representations of opaque and transparent editorial units.

References Cited

UNITED STATES PATENTS

| | | | |
|---|---|---|---|
| 3,016,791 | 1/1962 | Van Inwagen | 353—11 |
| 3,071,753 | 1/1963 | Fritze | 353—27 |
| 3,205,765 | 9/1965 | Zoltai | 353—30 |
| 3,458,253 | 7/1969 | Hansen | 353—117 |

LEONARD FORMAN, Primary Examiner

A. J. MIRABITO, Assistant Examiner

U.S. Cl. X.R.

353—25, 75, 76, 121